Feb. 12, 1952 E. H. GUBOFF ET AL 2,585,007

OSCILLATOR CIRCUIT FOR USE IN DIATHERMY

Filed Jan. 19, 1948

Inventors
EDWARD H. GUBOFF
RAYMOND BINNEY

By C. G. Stratton

Attorney

Patented Feb. 12, 1952 2,585,007

UNITED STATES PATENT OFFICE 2,585,007

OSCILLATOR CIRCUITS FOR USE IN DIATHERMY

Edward H. Guboff, Los Angeles, and Raymond Binney, Venice, Calif.

Application January 19, 1948, Serial No. 2,998

17 Claims. (Cl. 250—36)

Figure 1:
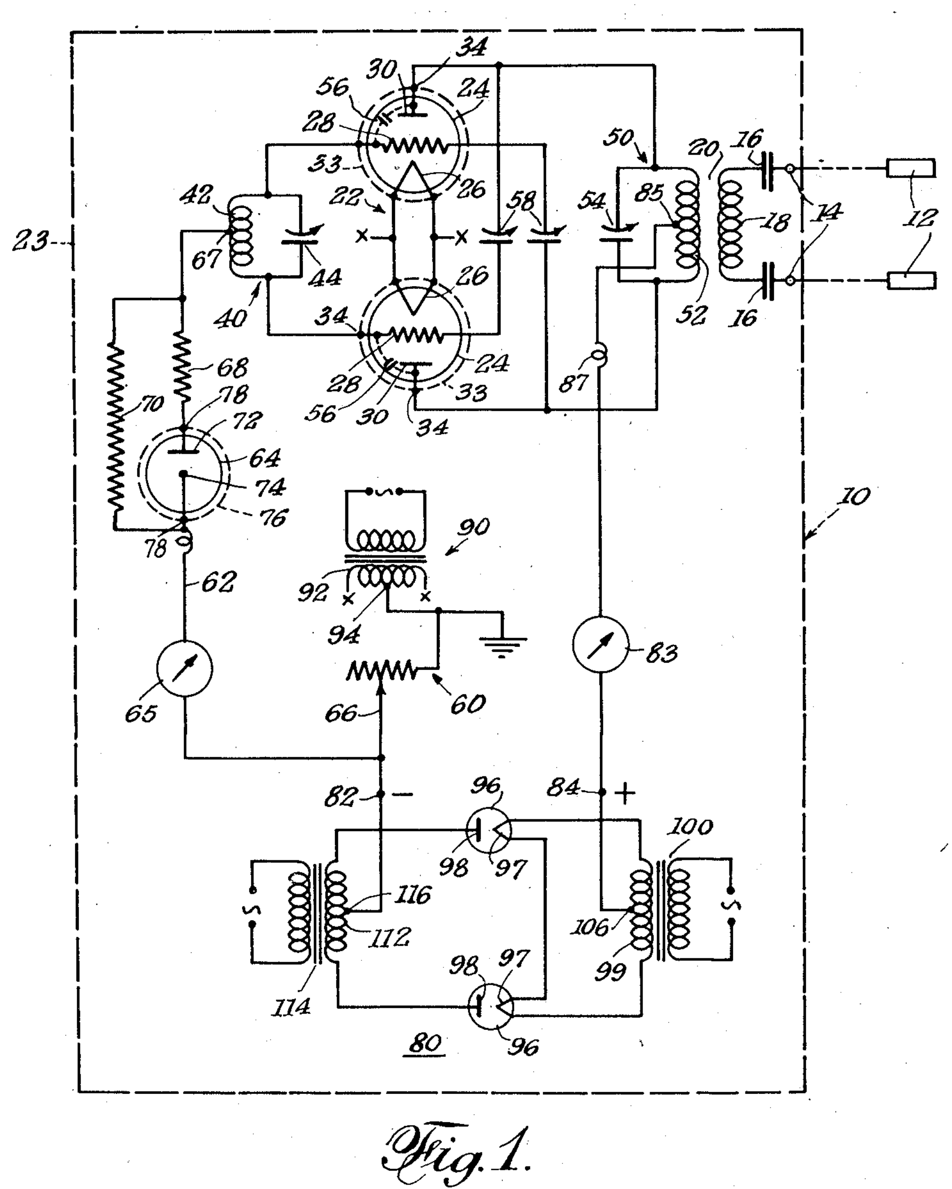

This invention relates to improvements in electronic oscillators and more particularly to improved oscillator circuits for use in diathermy.

In the practice of diathermy, electrical waves of radio-frequency are generated in an oscillator and the output of this oscillator is applied to a patient through a pair of electrodes, or pads. Oscillators of the type which have been employed for this purpose in the past have been subject to wide variations in output current and in frequency from one patient to another and from one time to another during the treatment of a patient. In particular, in diathermy oscillators which have been used commonly in the past, the amount of energy being supplied to the patient is determined very largely by changing tuning of the oscillator circuit. Due to the fact that the patient is coupled to this circuit, the resonant frequency of the secondary circuit in which he is connected is subject to variation during the treatment, particularly, inasmuch as blood rushing to the portion of the body subjected to treatment, causes the capacitance between the treatment electrodes to vary. It sometimes happens that as the treatment continues, the secondary circuit including the patient approaches resonance and reacts upon the oscillator to increase the output to such an extent that the patient is severely burned internally.

The type of oscillators which have been commonly employed heretofore in diathermy have generally been of a type which generate a large proportion of harmonics or other overtones, such as parasitic oscillations. With the increased use of frequency modulation and television, it has become increasingly desirable to restrict the frequency range of diathermy apparatus to the point where it interferes very little with such broadcasts. In fact, this problem has become so serious that the Federal Communications Commission has now restricted the use of ordinary diathermy apparatus to a frequency in a narrow band lying between 27.160 and 27.480 mc. (megacycles).

Accordingly, it is an object of this invention to provide a diathermy oscillator having a high degree of frequency stability and lower overtone content.

Another object of this invention is to provide a diathermy oscillator in which both the frequency of oscillation and the power output are comparatively closely regulated independently of changes in output load.

The foregoing objects and advantages of this invention will be more clearly understood by referring to the following description and the accompanying drawing in which:

The figure is a schematic wiring diagram of diathermy apparatus employing an oscillator in accordance with the invention.

In the drawings, there is illustrated diathermy equipment 10 including a pair of electrodes, or pads, 12 which are placed upon a patient to be treated. The pads 12 are plugged into terminals 14 connected through condensers 16 to the secondary winding 18 of the output transformer 20 of a radio-frequency oscillator 22 mounted on a chassis 23. According to this invention the oscillator is designed to operate at a constant frequency and with a constant output and low overtone content even though there may be wide changes in the amount of load placed between the electrodes 12.

To this end a radio-frequency oscillator 22 of the balanced push-pull tuned-grid, tuned-plate type is employed. The oscillator 22 includes a pair of triodes 24 each having a cathode 26, a control grid 28, and an anode 30, each of which is mounted in a tube socket indicated by the dotted circles 33 having appropriate electrode contacts or terminals 34 into which the respective pins connected to the electrodes 26, 28 and 30 of each triode are electrically connected. A high-Q tuned-grid circuit 40, including an inductance 42 and a variable condenser 44, is connected between the control grids 28 of the two triodes. Also, a high-Q tuned plate circuit 50 including the primary winding 52 of the output transformer 20 and the variable condenser 54 are connected between the anodes 30 of the two triodes 24. Alternating current signals in the output are supplied to the input of the oscillator 22 by means of the inherent inter-electrode capacities 56 which couple the anode 30 to the control electrode 28 of each of the triodes 24. A variable neutralizing condenser 58 is connected between the anode 30 of each of the triodes to the control grid 28 of the other triode.

In practice, the two tuned circuits 40 and 50 are tuned to the same resonant frequency in order to produce radio-frequency oscillations of the desired frequency in the diathermy band, that is, 27.32 mc. plus or minus 0.16 mc. Preferably, the secondary winding 18 of the output transformer is only loosely coupled to the primary winding 52 thereof to minimize effects of load variations.

In order to further minimize fluctuations in frequency and power, the bias to the control grids 28 of the two triodes 24 is controlled in part through a cathode resistor 60 and a grid line 62 which includes a voltage regulator tube 64 of the glow tube or gaseous discharge type and a current meter 65. In order to permit adjustment of the power output of the oscillator 10, the cathode resistor 60 is in the form of a rheostat having a sliding contact 66. A full-wave power supply 80 mounted on the chassis 23 supplies rectified direct current between a negative terminal 82 and a positive terminal 84. The negative terminal 82 is connected directly to the sliding contact 66 and the positive terminal 84 is connected through an output current meter 83 and a radio-frequency choke coil 87 to a center tap 85 of the inductance coil 52 in the tuned plate circuit 50. The grid line 62 which includes the voltage regulator tube 64, is connected between the movable contact 66 of the rheostat 60 and the center tap 67 of the inductance coil 42 in the tuned grid circuit 40. This line includes a ballast resistor 68 and a radio-frequency choke 69, in series with the voltage regulator tube 64. An auxiliary resistor 70, having a value several times that of the ballast resistor 68, is connected across the ballast resistor 68 and the voltage regulator tube 64. The voltage regulator tube 64 includes a cathode 72 and an anode 74 which are respectively connected through the circuits mentioned to the control grids 28 and the cathodes 26 of the triodes 24. The voltage regulator tube 64 is mounted in a socket indicated by the dotted circle 76 which has appropriate terminals 78 into which the pins of the voltage regulator tube are plugged.

The cathodes 26 of the triodes 24 are heated by means of a filament transformer 90, the secondary winding 92 of which is connected directly to the heater terminals of the two triode sockets 32, as indicated by the letters *x*, *x*. To complete the connection of the cathodes 26, the control grids 28, and the anodes 30, one end of the rheostat 60 is connected to a grounded center tap 94 of the secondary winding 92 of the filament transformer.

The power supply 80 includes two diodes 96, each having a filament 97 and an anode 98. The two filaments 97 of the diodes 96 are connected in series across opposite terminals of a secondary winding 99 of a power supply filament transformer 100. A center tap 106 on the secondary winding is directly connected to the positive terminal 84 of the power supply. The anodes 98 of the diodes 96 are connected to opposite ends of the secondary winding 112 of a high voltage step-up transformer 114. A center tap 116 on the secondary 112 is connected directly to the negative terminal 82 of the power supply.

When the primary windings of the three transformers 90, 100, and 114 are connected to a source of alternating current, the electrodes of the triodes 24 are energized and the oscillator 22 oscillates. The frequency of oscillation is determined by the tuning of the two resonant circuits 40 and 50, and the power output of the oscillator is determined by the setting of the rheostat 60. While the oscillator 22 is oscillating, the control grids 28 are periodically driven positive, thereby causing current to flow through the grid line 62. In operation, the voltage developed between the control grids 28 and the sliding contact 66 of the rheostat exceeds the ignition voltage of the voltage regulator tube 64, thereby maintaining this tube ignited and providing a relatively large voltage drop therethrough for determining the average negative bias on the control grids. This bias is varied by adjustment of the rheostat 60, this adjustment resulting in a change in the value of the resistance included in the cathode circuit, which controls the amount of power applied to the anode circuit without a variation in frequency of oscillation. Heretofore, power output was adjusted by means of changing the tuning of the oscillator which necessarily varied the frequency.

The frequency of oscillation of the tube of a conventional oscillator is determined primarily by the constants of the plate circuit. Since energy is being taken from the plate circuit due to coupling of an external load, any variation in the conditions of the external circuit will be coupled back into the frequency determining portion of the oscillator. Any variation in frequency will accordingly affect the effective impedance of the plate circuit resulting in a change of plate current and associated change in anode voltage. This undesirable effect is minimized by application of the voltage regulator tube to the control grid circuit whereby the negative bias of the control grid remains substantially unchanged due to the characteristic of the voltage regulator tube in maintaining a substantially constant voltage drop therethrough. Accordingly, the cathode to control grid potential is dependent upon the flow of anode current through the cathode biasing resistor, this resistance, in effect, self-biasing the control grids. Any increase in anode current will therefore increase the self bias of the cathode thereby limiting the flow of anode current and maintaining it substantially constant under load variations.

In an oscillator circuit a change of frequency of oscillation will occur with variation of anode voltage. This change of frequency is minimized due to the effect of the described circuit in maintaining the anode current substantially constant.

The application of a ballast resistor in series with the voltage regulator tube will insure positive ignition of the tube and serve to limit any excessive control grid current as well as effectively controlling the grid bias. Also it will act as a protective element in the event of a short-circuit in the voltage regulator tube thus preventing the anode current from uncontrollably increasing.

The auxiliary resistor operates as a safety element to prevent free-running anode current in the event of inoperation or erroneous removal of the voltage regulator tube.

While the apparatus described employs a rectifier 80, in practice it is found that many of the advantages of the invention may be obtained by supplying alternating current voltages to the triodes 24. This may be done, for example, by omitting the transformer 100 and the diodes 96, disconnecting the terminal 82 from the center tap 116, and then connecting the terminals 82 and 84 to opposite ends of the secondary winding 112 of the step-up transformer 114.

With the circuit described above, it is found that a radio-frequency signal may be generated which is relatively free of over-tones including both harmonics of the fundamental frequency of oscillation and parasitic oscillations. Both the fundamental frequency of oscillation and the power output remain substantially independent of load. Of course, it is to be understood here that when substantial independence of power output with load is mentioned, it is to be emphasized that the power output varies some, but does not run wild as in that type of diathermy equipment used in the past which has often resulted in burning a patient during treatment.

Though a preferred embodiment of the invention has been described in detail, many modifications will occur to those skilled in the art. In particular, it is to be understood that this invention may be applied to other types of oscillators and to other types of heating equipment or other equipment subject to a wide variation in load during use. It is, therefore, intended to cover all such modifications that fall within the scope of the appended claims.

Having thus described our invention, what we claim and desire to secure by Letters Patent is:

1. In an electrical heating system comprising a radio-frequency oscillator including a variable-gain amplifier tube having a cathode and a control grid and an anode, and also including a grid circuit connected between said cathode and said control grid and an anode circuit connected between said cathode and said anode, at least one of said circuits being tuned to a predetermined radio-frequency, said anode circuit and said cathode circuit being coupled to produce oscillations of said predetermined radio-frequency, said anode circuit including a radio-frequency transformer having a secondary winding provided with terminals for coupling to a load to be heated, said control grid drawing current periodically during oscillation, the improvement which comprises a biasing circuit including a voltage regulator tube of the gaseous discharge type connected between said control grid and said cathode normally rendered conductive by grid to cathode potential developed in said amplifier tube to vary grid to cathode bias in direct proportion to anode current variations to maintain anode current substantially constant under load variations.

2. In an electrical heating system comprising a radio-frequency oscillator including a variable-gain amplifier tube having a cathode and a control grid and an anode, and also including a grid circuit connected between said cathode and said control grid and an anode circuit connected between said cathode and said anode, at least one of said circuits being tuned to a predetermined radio-frequency, said anode circuit and said cathode circuit being coupled to produce oscillations of said predetermined radio-frequency, said anode circuit including a radio-frequency transformer having a secondary winding provided with terminals for coupling to a load to be heated, said control grid drawing current periodically during oscillation, the improvement which comprises a biasing circuit including a voltage regulator tube of the gaseous discharge type connected between said control grid and said cathode, a resistor in series with said regulator tube, and a second resistor shunting said regulator tube and the aforementioned resistor.

3. In an electrical heating system comprising a radio-frequency oscillator including a variable-gain amplifier tube having a cathode and a control grid and an anode, and also including a grid circuit connected between said cathode and said control grid and an anode circuit connected between said cathode and said anode, at least one of said circuits being tuned to a predetermined radio-frequency, said anode circuit and said cathode circuit being coupled to produce oscillations of said predetermined radio-frequency, said anode circuit including a radio-frequency transformer having a secondary winding provided with terminals for coupling to a load to be heated, said control grid drawing current periodically during oscillation, the improvement which comprises a variable resistor having one end connected to said cathode and the other end connected to said anode and a biasing circuit including a voltage regulator tube of the gaseous discharge type connected between said control grid and said other end of said resistor normally rendered conductive by grid to cathode potential developed in said amplifier tube operative to vary grid bias established by said variable resistor in direct proportion to anode current variations for maintaining the anode current substantially constant under variations in load conditions.

4. In an electrical heating system comprising a radio-frequency oscillator including a pair of variable-gain amplifier tubes connected in push-pull amplifying relation, each of said amplifier tubes having a cathode, a control grid, and an anode, and also including a grid circuit including a first inductance coil symmetrically connected between the control grids of said amplifier tubes and an anode circuit including a second inductance coil symmetrically connected between the anodes of said amplifier tubes, at least one of said circuits being tuned to a predetermined radio-frequency, said anode circuit and said cathode circuit being coupled to produce oscillations of said radio-frequency, said control grids drawing current periodically during oscillation, the improvement which comprises a biasing circuit including a cathode biasing resistor and a voltage regulator tube of the gaseous discharge type connected between the center of said first coil and said cathode resistor normally conductive to grid leak current for maintaining a constant voltage across said voltage regulator tube over an appreciable range of grid leak current to vary grid bias in direct proportion to anode current variations to maintain anode circuit current substantially constant under load variations.

5. An electrical heating system as described in claim 4, including a ballast resistor in series with said regulator tube.

6. In an electrical heating system comprising a radio-frequency oscillator including a pair of variable-gain amplifier tubes connected in push-pull amplifying relation, each of said amplifier tubes having a cathode, a control grid, and an anode, and also including a grid circuit including a first inductance coil symmetrically connected between the control grids of said amplifier tubes and an anode circuit including a second inductance coil symmetrically connected between the anodes of said amplifier tubes, at least one of said circuits being tuned to a predetermined radio-frequency, said anode circuit and said cathode circuit being coupled to produce oscillations of said radio-frequency, said control grids drawing current periodically during oscillation, the improvement which comprises a biasing circuit including a voltage regulator tube of the gaseous discharge type connected between the center of said first coil and said cathodes, a resistor in series with said regulator tube, and a second resistor shunting said regulator tube and the aforementioned resistor.

7. In an electrical heating system comprising a radio-frequency oscillator including a pair of variable-gain amplifier tubes connected in push-pull amplifying relation, each of said amplifier tubes having a cathode, a control grid, and an anode, and also including a grid circuit including a first inductance coil symmetrically connected between the control grids of said amplifier tubes and an anode circuit including a second inductance coil symmetrically connected between the anodes of said amplifier tubes, at least one of said circuits being tuned to a predetermined radio-frequency, said anode circuit and said grid circuit being coupled to produce oscillations of said radio-frequency, said control grids drawing current periodically during oscillation, the improvement which comprises a variable resistor having one end connected to said cathodes and the other end connected to the center of said second inductance coil and a biasing circuit including a voltage regulator tube of the gaseous discharge type connected between the center of said first inductance coil and said other end of said resistor normally rendered conductive by grid to cathode potential developed in said amplifier tube operative to vary grid bias established by said variable resistor in direct proportion to anode current variations for maintaining the anode current substantially constant under variations in load conditions.

8. An electrical heating system as described in claim 7, including a ballast resistor in series with said regulator tube.

9. In a diathermic heating system comprising a radio-frequency oscillator including a pair of variable-gain amplifier tubes connected in push-pull amplifying relation, each of said amplifier tubes having a cathode, a control grid, and an anode, and also including a grid circuit including a first inductance coil symmetrically connected between the control grids of said amplifier tubes and an anode circuit including a second inductance coil symmetrically connected between the anodes of said amplifier tubes, at least one of said circuits being tuned to a predetermined radio-frequency, said anode circuit and said cathode circuit being coupled to produce oscillations of said radio-frequency, said anode circuit including a radio-frequency transformer having a secondary winding provided with terminals for attachment to a pair of diathermy heating pads, said control grids drawing current periodically during oscillation, a variable resistor having one end connected to said cathodes and the other end connected to the center of said second inductance coil and a biasing circuit including a grid resistor connected between the center of said first inductance coil and said other end of said variable resistor having a substantially constant voltage drop therethrough over an appreciable current range for varying cathode to grid bias in conjunction with said variable resistor in direct proportion to anode current variations for maintaining anode circuit current substantially constant under load variations.

10. An electrical heating system according to claim 3, including a resistor in series with the regulator tube.

11. In an electrical heating system comprising a radio-frequency oscillator including a variable-gain amplifier tube having a cathode and a control grid and an anode, and also including a grid circuit connected between said cathode and said control grid and an anode circuit connected between said cathode and said anode, at least one of said circuits being tuned to a predetermined radio-frequency, said anode circuit and said cathode circuit being coupled to produce oscillations of said predetermined radio-frequency, said anode circuit including a radio-frequency transformer having a secondary winding provided with terminals for coupling to a load to be heated, said control grid drawing current periodically during oscillation, the improvement which comprises a variable resistor having one end connected to said cathode and the other end connected to said anode and a biasing circuit including a voltage regulator tube of the gaseous discharge type connected between said control grid and said other end of said resistor for controlling the amount of current generated in said anode circuit, a first resistor in series with the regulator tube, and a second resistor shunting the regulator tube and the first resistor.

12. In an electrical heating system comprising a radio-frequency oscillator including a pair of variable-gain amplifier tubes connected in push-pull amplifying relation, each of said amplifier tubes having a cathode, a control grid, and an anode, and also including a grid circuit including a first inductance coil symmetrically connected between the control grids of said amplifier tubes and an anode circuit including a second inductance coil symmetrically connected between the anodes of said amplifier tubes, at least one of said circuits being tuned to a predetermined radio-frequency, said anode circuit and said grid circuit being coupled to produce oscillations of said radio-frequency, said control grids drawing current periodically during oscillation, the improvement which comprises a variable resistor having one end connected to said cathodes and the other end connected to the center of said second inductance coil and a biasing circuit including a voltage regulator tube of the gaseous discharge type connected between the center of said first inductance coil and said other end of said resistor for controlling the amount of current generated in said anode circuit, a first resistor in series with the regulator tube, and a second resistor in shunt with the regulator tube and the first resistor.

13. In a diathermic heating system comprising a radio-frequency oscillator including a pair of variable-gain amplifier tubes connected in push-pull amplifying relation, each of said amplifier tubes having a cathode, a control grid, and an anode, and also including a grid circuit including a first inductance coil symmetrically connected between the control grids of said amplifier tubes and an anode circuit including a second inductance coil symmetrically connected between the anodes of said amplifiers tubes, at least one of said circuits being tuned to a predetermined radio-frequency, said anode circuit and said cathode circuit being coupled to produce oscillations of said radio frequency, said anode circuit including a radio-frequency transformer having a secondary winding provided with terminals for attachment to a pair of diathermy heating pads, said control grids drawing current periodically during oscillation, and a biasing circuit including a grid resistor connected between the center of said first inductance coil and said other end of said variable resistor for controlling the amount of current generated in said anode circuit, a voltage regulator tube of the gaseous discharge type connected in the biasing circuit in series with the grid resistor, and a second resistor in shunt with the regulator tube and the grid resistor.

14. In an electrical heating system comprising a radio-frequency oscillator, a pair of variable-gain amplifier tubes connected in push-pull amplifying reaction, each of said tubes having a cathode, a control grid, and an anode; a grid circuit including a first inductance coil and a first variable condenser in parallel with said coil and symmetrically connected between the control grids of said amplifier tubes; and an anode circuit including a second inductance coil and a second variable condenser in parallel with said second coil and symmetrically connected between the anodes of said amplifier tubes, at least one of said circuits being tuned to a predetermined radio-frequency, said anode circuit and said grid circuit being coupled to produce oscillation of said radio-frequency; a secondary winding inductively coupled to said second inductance coil for supplying radio-frequency current to the load; said control grids drawing current periodically during oscillation; a power supply for said amplifier tubes, the first terminal of said power supply being connected to the center of the second inductance coil; a biasing circuit; a variable resistor having one end connected to the mentioned cathodes, the other end of said variable resistor being connected to the second terminal of said power supply and to said biasing circuit, said latter circuit including a voltage regulator tube of the gaseous discharge type and a first resistor in series with said voltage regulator tube and a second resistor in shunt with said voltage regulator tube and said first resistor; said biasing circuit being connected between the center of said first inductance coil and the other end of said variable resistor.

15. In an electrical heating system comprising a tuned radio-frequency oscillator having vacuum tube means including cathode, grid and anode circuits, means for inductively coupling a load to be heated to said anode circuit, said grid circuit conducting grid leak current periodically during oscillation, and biasing means in said grid circuit including ballast means having constant voltage drop over an appreciable range of grid current, a resistor in series with said ballast means, and a second resistor shunting said ballast means and said aforesaid resistor.

16. In an electrical heating system comprising a tuned radio-frequency oscillator having vacuum tube means including cathode, grid and anode circuits, means for inductively coupling a load to be heated to said anode circuit, said grid circuit conducting grid lead current periodically during oscillation, and said biasing means in said grid circuit including a voltage regulator tube of the gaseous discharge type, a resistor in series with said regulator tube, and a second resistor shunting said regulator tube and the aforementioned resistor.

17. In an electrical system for diathermy comprising, a tuned radio-frequency oscillator having vacuum tube means including cathode, grid and anode circuits, means for inductively coupling a load to be heated to said anode circuit, said grid circuit conducting grid lead current periodically during oscillation, and biasing means in said grid circuit comprising a biasing resistor in said cathode and grid circuits and a voltage regulator tube of the gaseous discharge type between said biasing resistor and the grid of said tube normally rendered conductive by grid to cathode potential developed in said tube for varying cathode to grid bias in direct proportion to anode current variations to maintain anode circuit current substantially constant under load variations.

EDWARD H. GUBOFF.
RAYMOND BINNEY.

REFERENCES CITED

The following references are of record in the file of this patent:

UNITED STATES PATENTS

| Number | Name | Date |
|---|---|---|
| 1,967,917 | Kramolin | July 24, 1934 |
| 2,010,381 | Numans | Aug. 13, 1935 |
| 2,373,560 | Hannert | Apr. 10, 1945 |
| 2,406,839 | Labin et al. | Sept. 3, 1946 |
| 2,482,493 | King | Sept. 20, 1949 |